(12) United States Patent
Wen et al.

(10) Patent No.: US 12,098,047 B2
(45) Date of Patent: Sep. 24, 2024

(54) CANTILEVER TYPE PLANE AUTOMATIC ADHESIVE TAPE PASTING DEVICE

(71) Applicant: Qingdao University of Science and Technology, Shandong (CN)

(72) Inventors: Shibao Wen, Shandong (CN); Yi Li, Shandong (CN); Chenxi Nie, Shandong (CN); Qin Du, Shandong (CN); Yuwei Feng, Shandong (CN); Luyao Wang, Shandong (CN); Shuo Wang, Shandong (CN); Leilei Yu, Shandong (CN)

(73) Assignee: Qingdao University of Science and Technology, Shandong (CN)

( * ) Notice: Subject to any disclaimer, the term of this patent is extended or adjusted under 35 U.S.C. 154(b) by 270 days.

(21) Appl. No.: 17/773,809

(22) PCT Filed: Nov. 11, 2021

(86) PCT No.: PCT/CN2021/130062
§ 371 (c)(1),
(2) Date: May 2, 2022

(87) PCT Pub. No.: WO2022/183768
PCT Pub. Date: Sep. 9, 2022

(65) Prior Publication Data
US 2023/0278824 A1 Sep. 7, 2023

(30) Foreign Application Priority Data
Mar. 1, 2021 (CN) .......................... 202110224923.5

(51) Int. Cl.
*B65H 35/00* (2006.01)
*B65B 51/06* (2006.01)

(52) U.S. Cl.
CPC ....... *B65H 35/0033* (2013.01); *B65B 51/067* (2013.01); *B65H 35/0086* (2013.01); *B65H 2404/10* (2013.01); *B65H 2701/377* (2013.01)

(58) Field of Classification Search
CPC B65H 35/008; B65H 35/0026; B65H 35/002; B65H 35/0006; B65H 35/0086;
(Continued)

(56) References Cited

U.S. PATENT DOCUMENTS 3,875,895 A * 4/1975 Todd .................. B65H 35/0046
118/40
4,227,955 A * 10/1980 Woods .................. B65B 51/067
156/289
(Continued)

*Primary Examiner* — Alex B Efta
(74) *Attorney, Agent, or Firm* — Seed IP Law Group LLP

(57) ABSTRACT

For the defects that manual adhesive tape pasting is low in efficiency and high in cost, and it is difficult to automatically paste adhesive tapes at specified positions of inner and outer surfaces of an item according to a certain length through a handheld box sealer and an adhesive tape seal pasting mechanism, a cantilever type plane automatic adhesive tape pasting device is invented. A liftable two-stage telescopic cantilever adhesive tape pasting head structure, a roller type automatic adhesive tape feeding structure, an adjustable fixed-length cutting structure and a roller type pasting structure are adopted for the device to achieve the automatic adhesive tape pasting on inner and outer side planes of an item. After the item needing adhesive tape pasting is positioned, the pasting process is completely automatically conducted without manual participation, the labor intensity is reduced, the labor efficiency is improved.

8 Claims, 5 Drawing Sheets

(58) Field of Classification Search
CPC . B65H 35/0033; B65H 35/0013; B65H 35/00
See application file for complete search history.

(56) References Cited

U.S. PATENT DOCUMENTS

| | | | | |
|---|---|---|---|---|
| 5,685,814 | A * | 11/1997 | Le | B65B 51/067 |
| | | | | 53/378.3 |
| 6,049,347 | A * | 4/2000 | Ewert | B41J 3/407 |
| | | | | 347/215 |
| 2009/0064636 | A1* | 3/2009 | Chu | B65B 59/02 |
| | | | | 156/468 |
| 2011/0239596 | A1* | 10/2011 | Thomas | B65B 51/067 |
| | | | | 53/476 |
| 2014/0245702 | A1* | 9/2014 | Loevenich | B65B 51/067 |
| | | | | 53/378.3 |

* cited by examiner

CANTILEVER TYPE PLANE AUTOMATIC ADHESIVE TAPE PASTING DEVICE

CROSS REFERENCE TO RELATED APPLICATION

This patent application claims the benefit and priority of Chinese Patent Application No. 202110224923.5, filed on Mar. 1, 2021, the disclosure of which is incorporated by reference herein in its entirety as part of the present application.

TECHNICAL FIELD

The present disclosure relates to the field of pasting of adhesive tapes, mainly relates to the automatic pasting of an adhesive tape, and particularly relates to a cantilever type plane automatic adhesive tape pasting device.

BACKGROUND ART

Various packaging containers and products often need to be sealed or pasted with adhesive tapes on the surfaces or inner surfaces, which is often manually operated. During manual operation, an adhesive tape roll is generally directly held by the hand to tear off the adhesive tape head, then the adhesive tape is pasted and manually cut at the same time when a pasting position is found, it is often necessary to look for the position of the adhesive tape head during operation, the entire operation process is small in difficulty but has large labor demand, resulting in a great effect on the production efficiency.

To avoid the defect of repeatedly looking for the position of the adhesive tape head and to facilitate the cutting of the adhesive tape, there are various types of handheld box sealers on the market, the principle of which is basically to install an adhesive tape roll in the box sealer, to paste the adhesive tape by holding the box sealer with the hand after pulling out the adhesive tape head, and to break the adhesive tape using a cutting knife at the end part of the box sealer after the pasting is finished, thus completing the box sealing process. Compared to manual sealing, the handheld box sealer has made a great progress: firstly, it is no longer necessary to look for the adhesive tape head frequently; secondly, it is more convenient to cut off the adhesive tape, and thirdly, it can be operated with one hand. However, a starting position of the device during box sealing still needs to be manually controlled, and it is difficult to operate in the container.

To further improve the efficiency of box sealing, an adhesive tape seal pasting mechanism (Document 1: Chemical Industry Press, *Practical Manual of Packaging Machinery* edited by Li, Lianjin, 2019.11.p559) has emerged. Automatic adhesive tape pasting on the top and the bottom can be directly completed when a packaged rectangular (carton) container passes through the mechanism, and the mechanism is suitable for large-scale adhesive tape seal pasting of the rectangular packaging container. However, during the work of the mechanism, the adhesive tape pasting process can only be conducted by the pushing of the rectangular container, that is, the device can only be applied to the adhesive tape pasting of a rigid rectangular container, and is not suitable for independent pasting on the surface plane of an item and is not suitable for pasting on the inner surface of the container.

In actual production, adhesive tapes often need to be pasted to specified positions of outer or inner planes of items according to a certain length in a large batch of products, at the moment, the mechanism in document 1 cannot be used. Although a handheld box sealer can be used, the defects that the starting position needs to be manually controlled, the length of the adhesive tape pasted by one person is limited, inner pasting is difficult and the like still exist, and pure manual operation is low in efficiency and high in cost. Therefore, to paste the adhesive tape on the specific position of the plane of the item according to a certain length rapidly and efficiently, an automatic adhesive tape pasting device capable of being applied to inner and outer surfaces needs to be developed.

SUMMARY

For the defects that manual adhesive tape pasting is low in efficiency and high in cost, and it is difficult to automatically paste adhesive tape at specified positions of inner and outer surfaces of an item according to a certain length through a handheld box sealer and an adhesive tape seal pasting mechanism, a cantilever type plane automatic adhesive tape pasting device is invented.

A technical solution adopted by the present disclosure to solve the technical problem is as follows: a cantilever type plane automatic adhesive tape pasting device consists of a base (71), an adhesive tape pasting stand (72), an adhesive tape pasting cantilever assembly (73), an adhesive tape fixing roller (74), a pull-open adhesive tape (75), an adhesive tape feeding motor (76), an adhesive tape cutting knife (77), and an adhesive tape pasting head (78), and a lifting type two-stage telescopic cantilever adhesive tape pasting head structure is adopted;

the adhesive tape pasting stand (72) is wholly of an H-shaped structure and comprises an adhesive tape feeding driven roller (81), an adhesive tape feeding driving roller (82), an adhesive tape pasting cantilever assembly mounting hole (83), a cantilever assembly guide groove (84), an adhesive tape guide roller A (85), an adhesive tape feeding cantilever (86), an adhesive tape cutting cantilever (87), an adhesive tape guide roller B (88), and a cutting knife mounting hole (89); symmetrical cantilever assembly guide grooves (84) are formed in the inner sides of leg openings of the H-shaped structure, and adhesive tape pasting cantilever assembly mounting holes (83) are formed in the bottom surfaces of the leg openings of the H-shaped structure; a double-layer cantilever adhesive tape feeding cantilever (86) and an adhesive tape cutting cantilever (87) are arranged at one side of the H-shaped structure; the adhesive tape feeding driven roller (81) and the adhesive tape feeding driving roller (82) are mounted at the end part of the cantilever adhesive tape feeding cantilever (86); the adhesive tape guide roller A (85) is mounted below the end part of the adhesive tape cutting cantilever (87), and the roller surface of the adhesive tape guide roller A (85) is pasted with a release film; the cutting knife mounting hole (89) is formed in the middle of the adhesive tape cutting cantilever (87); and the roller surface of the adhesive tape feeding driven roller (81) is pasted with a release film;

the adhesive tape guide roller B (88) and the adhesive tape fixing roller (74) are respectively fixed to the upper part of the H-shaped structure of the adhesive tape pasting stand (72), and the adhesive tape guide roller B (88) is lower than the adhesive tape fixing roller (74);

the adhesive tape feeding motor (76) is fixed to the outer side of the cantilever adhesive tape feeding cantilever (86) on the adhesive tape pasting stand (72) and is coaxial with the adhesive tape feeding driving roller (82);

the adhesive tape cutting knife (77) is fixed to the cutting knife mounting hole (89) in the adhesive tape cutting cantilever (87) on the adhesive tape pasting stand (72);

the adhesive tape pasting cantilever assembly (73) is of a telescopic structure and is mounted at leg openings of the H-structure of the adhesive tape pasting stand (72);

the adhesive tape pasting head (78) is mounted at the end part of the telescopic structure on the adhesive tape pasting cantilever assembly (73);

the pull-open adhesive tape (75) is an open state of an adhesive tape mounted on the adhesive tape fixing roller (74); and the adhesive tape pasting stand (72) is fixed onto the base (71).

Preferably, the adhesive tape pasting cantilever assembly (73) consists of a lifting guide rod (91), a fixed cantilever sleeve (92), a cantilever guide block (93), an adhesive tape pasting push-pull device (94), a first-stage pull-out cantilever (95), a second-stage pull-out cantilever (102), and an adhesive tape pasting push-pull rod (103); the fixed cantilever sleeve (92), the first-stage pull-out cantilever (95) and the second-stage pull-out cantilever (102) form a pull-out cantilever; and a pair of lifting guide rods (91) is fixed below the fixed cantilever sleeve (92);

the cantilever guide blocks (93) are fixed to two side faces of one end of the fixed cantilever sleeve (92);

the adhesive tape pasting push-pull device (94) is fixed to the top of the fixed cantilever sleeve (92);

the first-stage pull-out cantilever (95) and the second-stage pull-out cantilever (102) are mounted in the fixed cantilever sleeve (92), and the first-stage pull-out cantilever (95) and the second-stage pull-out cantilever (102) and the fixed cantilever sleeve (92) are of a pull-out structure;

the end part of the second-stage pull-out cantilever (102) is of a fork structure having an adhesive tape pressing roller guide groove (100).

Preferably, the adhesive tape pasting head (78) consists of an adhesive tape placing baffle (96), an adhesive tape pressing roller stand (97), an adhesive tape pressing fixed roller (98), an adhesive tape pressing roller (99), an adhesive tape pressing push-pull device (101), a baffle support (104), and a compressing support (105), and is mounted at one end of the second-stage pull-out cantilever (102) of the adhesive tape pasting cantilever assembly (73);

the adhesive tape pressing fixed roller (98) is fixed to the end part of a fork structure of the second-stage pull-out cantilever (102);

the adhesive tape pressing roller (99) is mounted in the adhesive tape pressing roller guide groove (100) at the end part of the second-stage pull-out cantilever (102) through the adhesive tape pressing roller stand (97);

the baffle support (104) and the compressing support (105) are fixed to the upper side of the fork bottom of the second-stage pull-out cantilever (102);

the adhesive tape pressing roller push-pull device (101) is fixed onto the compressing support (104), and a push-pull rod of the adhesive tape pressing roller push-pull device (101) is fixed to the adhesive tape pressing roller stand (97);

the distance between the adhesive tape pressing fixed roller (98) and the adhesive tape pressing roller (99) is controlled by the adhesive tape pressing roller push-pull device (101);

the adhesive tape placing baffle (96) is fixed to the tops of the baffle support (104) and the compressing support (105).

Preferably, the adhesive tape pasting push-pull rod (103) in the adhesive tape pasting push-pull device (94) on the adhesive tape pasting cantilever assembly (73) is fixed to the baffle support (104) in the adhesive tape pasting head (78).

Preferably, the adhesive tape pasting cantilever assembly (73) is mounted in the adhesive tape pasting cantilever assembly mounting holes (83) of the adhesive tape pasting stand (72) through a pair of lifting guide rods (91), and the adhesive tape pasting head (78) of the cantilever type plane automatic adhesive tape pasting device and a cantilever end of the adhesive tape pasting stand (72) are located at the same side.

Preferably, the roller surfaces of the adhesive tape feeding driven roller (81), the adhesive tape guide roller A (85) and the adhesive tape pressing fixed roller (98) are each pasted with a release film.

Preferably, the surface of the adhesive tape pressing roller (99) is made of an elastic material.

Preferably, the pull-open adhesive type adhesive tape (75) is in a disconnected state before being pasted to an adhesive tape pasting position (112).

Compared to the handheld box sealer and the adhesive tape seal pasting mechanism, the cantilever type plane automatic adhesive tape pasting device provided by the present disclosure has the beneficial effects that: 1) automatic feeding and fixed length cutting of the adhesive tape are achieved; 2) the length of pasting the adhesive tape can be automatically adjusted as required; 3) the telescopic adhesive tape pasting head is convenient for pasting the adhesive tape on the inner surface; 4) after an item needing adhesive tape pasting is positioned, the pasting process is completely and full-automatically conducted without manual participation, the labor intensity is reduced, the labor efficiency is improved, and the pasted adhesive tape is neat in appearance and good in specification consistency.

Figure 1:
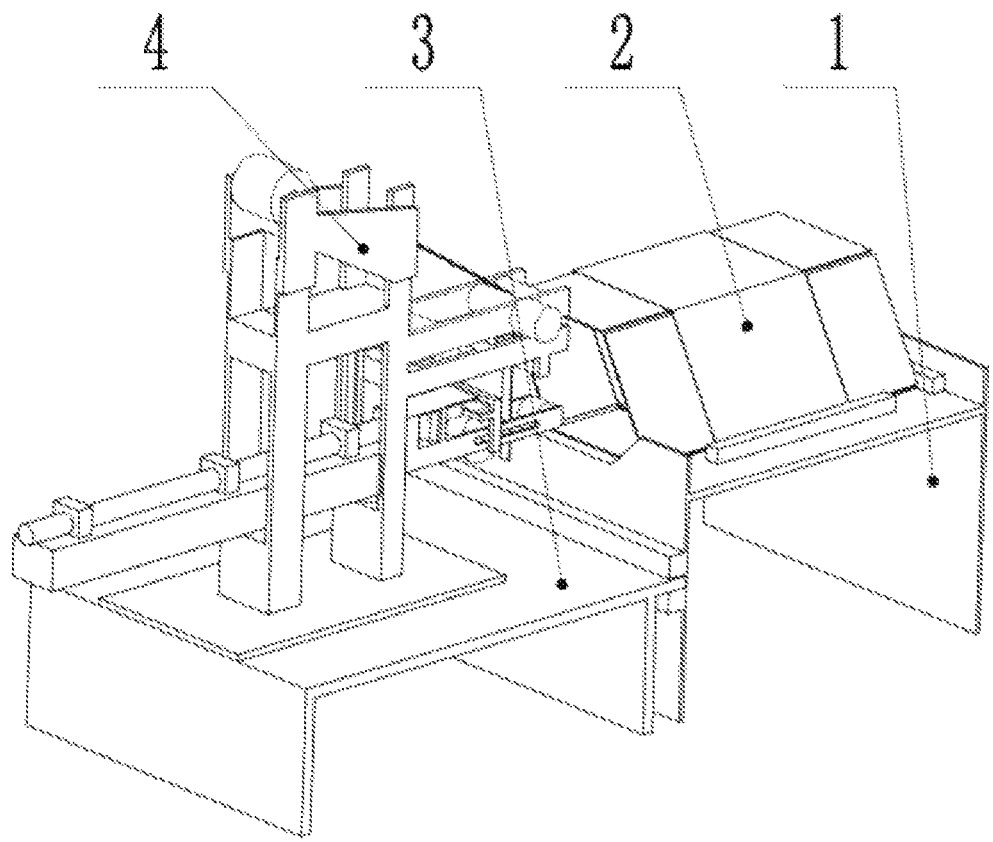
FIG. 1 is a three-dimensional view of application of a cantilever type plane automatic adhesive tape pasting device of the present disclosure.

In the drawings:
1—platform for item needing adhesive tape pasting, 2—item needing adhesive tape pasting, 3—adhesive tape pasting stand platform, 4—cantilever type plane automatic adhesive tape pasting device;
71—base, 72—adhesive tape pasting stand, 73—adhesive tape pasting cantilever assembly, 74—adhesive tape fixing roller, 75—pull-open adhesive tape, 76—adhesive tape feeding motor, 77—adhesive tape cutting knife; 78—adhesive tape pasting head;

81—adhesive tape feeding driven roller, 82—adhesive tape feeding driving roller, 83—adhesive tape pasting cantilever assembly mounting hole, 84—cantilever assembly guide groove, 85—adhesive tape guide roller A, 86—adhesive tape feeding cantilever, 87—adhesive tape cutting cantilever, 88—adhesive tape guide roller B, 89—cutting knife mounting hole;

91—lifting guide rod, 92—fixed cantilever sleeve, 93—cantilever guide block, 94—adhesive tape pasting push-pull device, 95—first-stage pull-out cantilever, 96—adhesive tape placing baffle, 97—adhesive tape pressing stand, 98—adhesive tape pressing fixed roller, 99—adhesive tape pressing roller, 100—adhesive tape pressing roller guide groove, 101—adhesive tape pressing roller push-pull device, 102—second-stage pull-out cantilever, 103—adhesive tape pasting push-pull rod, 104—baffle support, 105—compressing support;

111—adhesive tape pasting starting position, 112—adhesive tape pasting position, 113—adhesive tape pasting ending position.

DETAILED DESCRIPTION OF THE EMBODIMENTS

Figure 2:
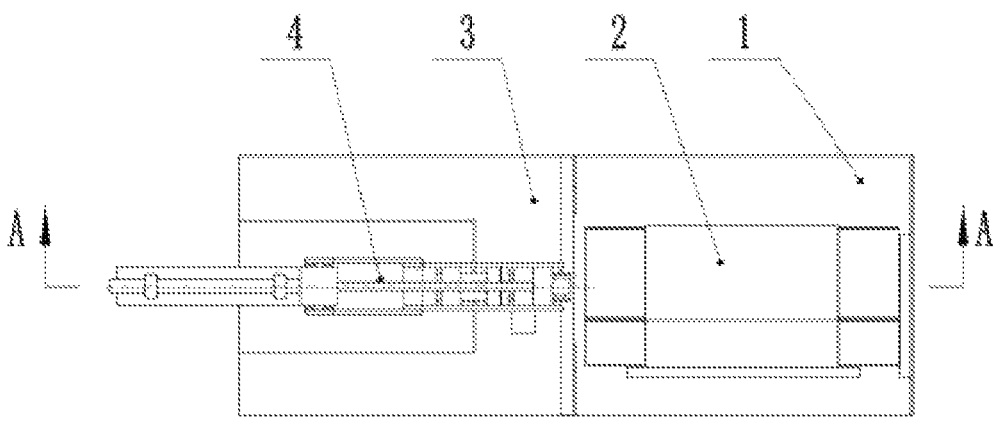
FIG. 2 is a vertical view of FIG. 1.

Referring to FIG. 1 and FIG. 2, an automatic adhesive tape pasting action can be conducted by combining a cantilever type plane automatic adhesive tape pasting device (4) with a platform (1) for an item needing adhesive tape pasting, an item (2) needing adhesive tape pasting, and an adhesive tape pasting stand platform (3). The adhesive tape pasting stand platform (3) and the platform (1) fort the item needing adhesive tape pasting are arranged and connected in parallel, the cantilever type plane automatic adhesive tape pasting device (4) is fixed onto the adhesive tape pasting stand platform (3), a length direction of the cantilever type plane automatic adhesive tape pasting device (4) is perpendicular to the adhesive tape pasting item platform (1), and the item (2) needing adhesive tape pasting is fixed to the surface of the adhesive tape pasting item platform (1).

Referring to FIG. 3, FIG. 4, FIG. 5 and FIG. 6, the cantilever type plane automatic adhesive tape pasting device (4) consists of a base (71), an adhesive tape pasting stand (72), an adhesive tape pasting cantilever assembly (73), an adhesive tape fixing roller (74), an adhesive tape feeding motor (76), an adhesive tape cutting knife (77), and an adhesive tape pasting head (78), wherein the adhesive tape pasting stand (72) is wholly of an H-shaped structure and comprises an adhesive tape feeding driven roller (81), an adhesive tape feeding driving roller (82), an adhesive tape pasting cantilever assembly mounting hole (83), a cantilever assembly guide groove (84), an adhesive tape guide roller A (85), an adhesive tape feeding cantilever (86), an adhesive tape cutting cantilever (87), an adhesive tape guide roller B (88), and a cutting knife mounting hole (89); symmetrical cantilever assembly guide grooves (84) are formed in the inner sides of leg openings of the H-shaped structure, and adhesive tape pasting cantilever assembly mounting holes (83) are formed in the bottom surfaces of the leg openings of the H-shaped structure; a double-layer cantilever adhesive tape feeding cantilever (86) and an adhesive tape cutting cantilever (87) are arranged at one side of the H-shaped structure; the adhesive tape feeding driven roller (81) and the adhesive tape feeding driving roller (82) are mounted at the end part of the cantilever adhesive tape feeding cantilever (86); the adhesive tape guide roller A (85) is mounted below the end part of the adhesive tape cutting cantilever (87), and the roller surface of the adhesive tape guide roller A (85) is pasted with a release film; the cutting knife mounting hole (89) is formed in the middle of the adhesive tape cutting cantilever (87); and the roller surface of the adhesive tape feeding driven roller (81) is pasted with a release film;

the adhesive tape guide roller B (88) and the adhesive tape fixing roller (74) are respectively fixed to the upper part of the H-shaped structure of the adhesive tape pasting stand (72), and the adhesive tape guide roller B (88) is lower than the adhesive tape fixing roller (74);

the adhesive tape feeding motor (76) is fixed to the outer side of the cantilever adhesive tape feeding cantilever (86) on the adhesive tape pasting stand (72) and is coaxial with the adhesive tape feeding driving roller (82); the adhesive tape cutting knife (77) is fixed to the cutting knife mounting hole (89) in the adhesive tape cutting cantilever (87) on the adhesive tape pasting stand (72); the adhesive tape pasting cantilever assembly (73) is of a telescopic structure and is mounted at leg openings of the H-structure of the adhesive tape pasting stand (72); the adhesive tape pasting head (78) is mounted at the end part of the telescopic structure on the adhesive tape pasting cantilever assembly (73); the adhesive tape pasting stand (72) is fixed onto the base (71).

Figure 6:
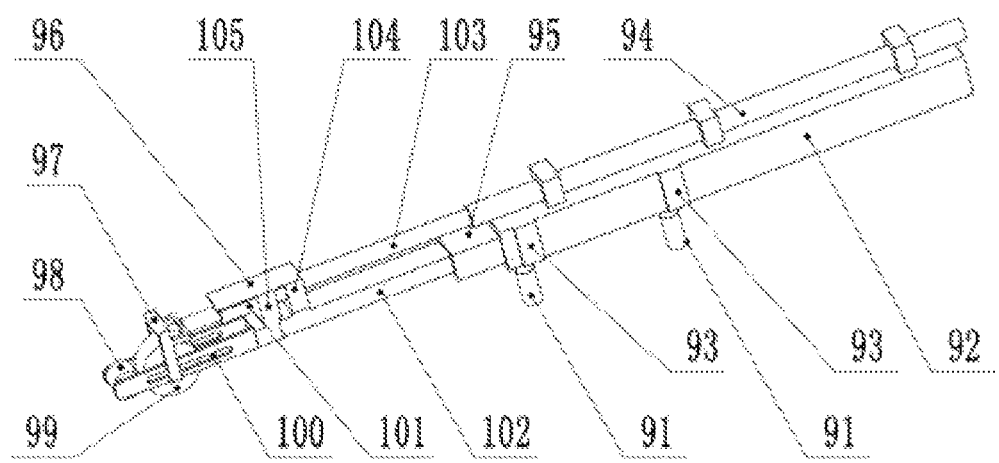
FIG. 6 is a three-dimensional structure diagram of an adhesive tape pasting cantilever assembly (73) in FIG. 3.

Referring to FIG. 6, the adhesive tape pasting cantilever assembly (73) consists of a lifting guide rod (91), a fixed cantilever sleeve (92), a cantilever guide block (93), an adhesive tape pasting push-pull device (94), a first-stage pull-out cantilever (95), a second-stage pull-out cantilever (102), and an adhesive tape pasting push-pull rod (103); the fixed cantilever sleeve (92), the first-stage pull-out cantilever (95) and the second-stage pull-out cantilever (102) form a pull-out cantilever; a pair of lifting guide rods (91) is fixed below the fixed cantilever sleeve (92); the cantilever guide blocks (93) are fixed to two side faces of one end of the fixed cantilever sleeve (92); the adhesive tape pasting push-pull device (94) is fixed to the top of the fixed cantilever sleeve (92); the first-stage pull-out cantilever (95) and the second-stage pull-out cantilever (102) are mounted in the fixed cantilever sleeve (92), and the first-stage pull-out cantilever (95) and the second-stage pull-out cantilever (102) are of a pull-out structure; the end part of the second-stage pull-out cantilever (102) is of a fork structure having an adhesive tape pressing roller guide groove (100).

Referring to FIG. 6, the adhesive tape pasting head (78) consists of an adhesive tape placing baffle (96), an adhesive tape pressing roller stand (97), an adhesive tape pressing fixed roller (98), an adhesive tape pressing roller (99), an adhesive tape pressing push-pull device (101), a baffle support (104), and a compressing support (105), and is mounted at one end of the second-stage pull-out cantilever (102) of the adhesive tape pasting cantilever assembly (73); the adhesive tape pressing fixed roller (98) is fixed to the end part of the fork structure of the second-stage pull-out cantilever (102), and the roller surface of the adhesive tape pressing fixed roller (98) is pasted with a release film; the adhesive tape pressing roller (99) is mounted in the adhesive tape pressing roller guide groove (100) at the end part of the second-stage pull-out cantilever (102) through the adhesive tape pressing roller stand (97), and the surface of the adhesive tape pressing roller (99) is made of an elastic material; the baffle support (104) and the compressing support (105) are fixed to the upper side of the fork bottom of the second-stage pull-out cantilever (102); the adhesive tape pressing roller push-pull device (101) is fixed onto the compressing support (104), and a push-pull rod of the adhesive tape pressing roller push-pull device (101) is fixed to the adhesive tape pressing roller stand (97); the distance between the adhesive tape pressing fixed roller (98) and the adhesive tape pressing roller (99) is controlled by the adhesive tape pressing roller push-pull device (101); the adhesive tape placing baffle (96) is fixed to the tops of the baffle support (104) and the compressing support (105).

Referring to FIG. 6, the adhesive tape pasting push-pull rod (103) in the adhesive tape pasting push-pull device (94) on the adhesive tape pasting cantilever assembly (73) is fixed to the baffle support (104) in the adhesive tape pasting head (78), and the adhesive tape pasting push-pull device (94) controls the movement of the adhesive tape pasting head (78).

Figure 3:
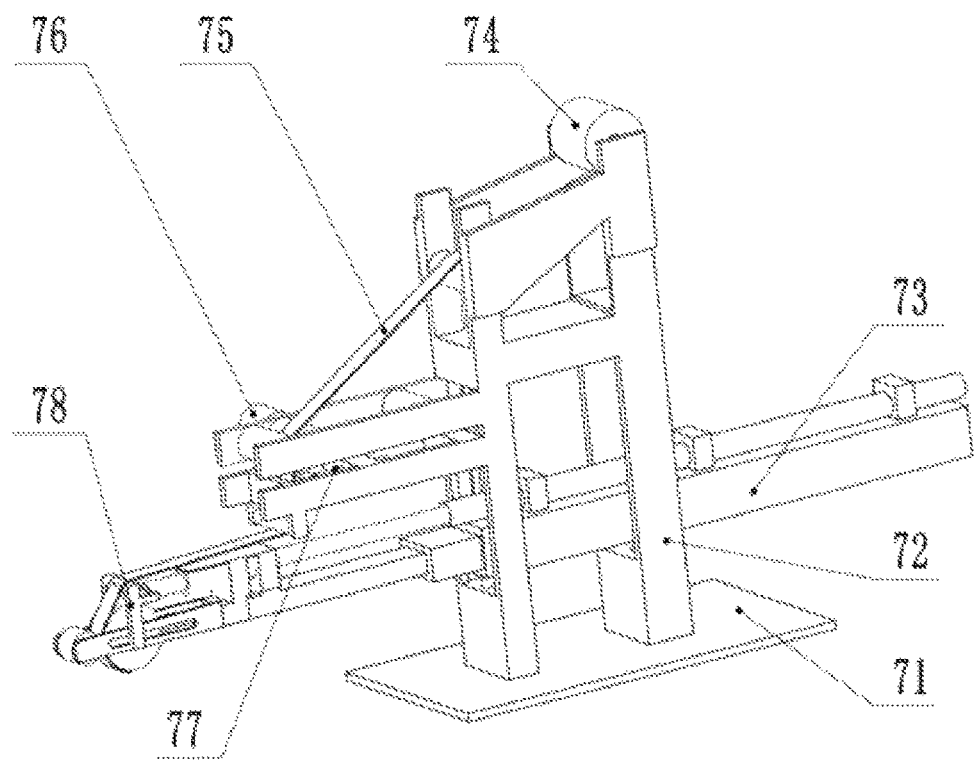
FIG. 3 is a three-dimensional structure diagram of a cantilever type plane automatic adhesive tape pasting device of the present disclosure.
Figure 4:
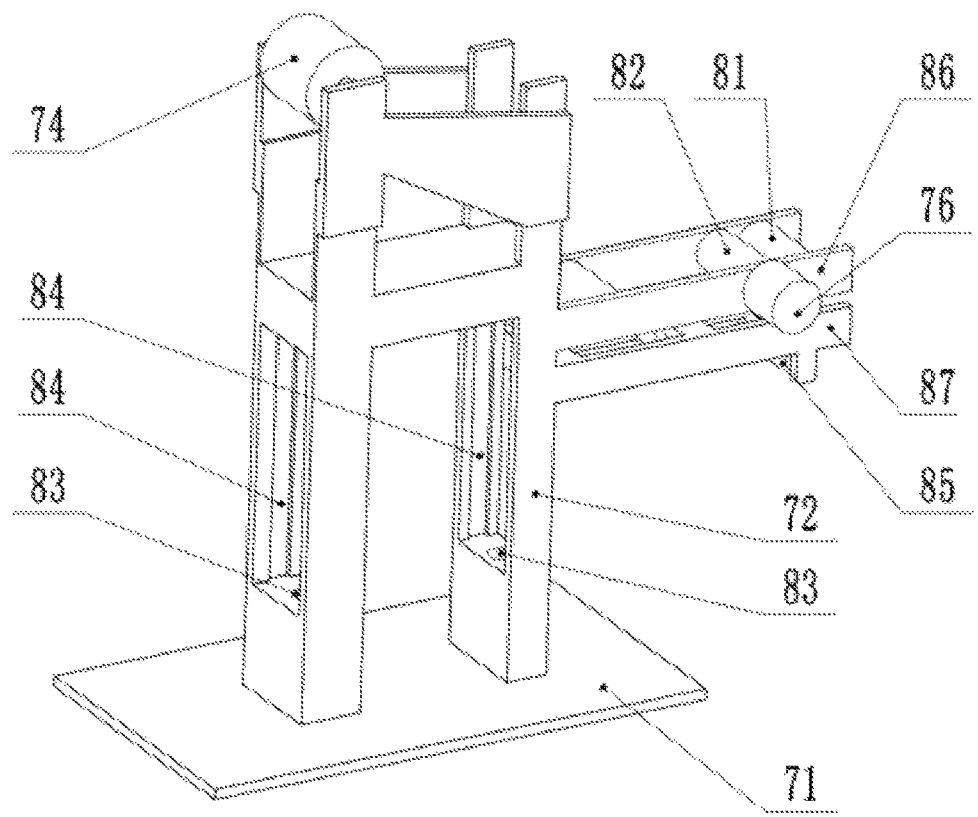
FIG. 4 is a three-dimensional structure diagram of an adhesive tape pasting stand (72) in FIG. 3.
Figure 5:
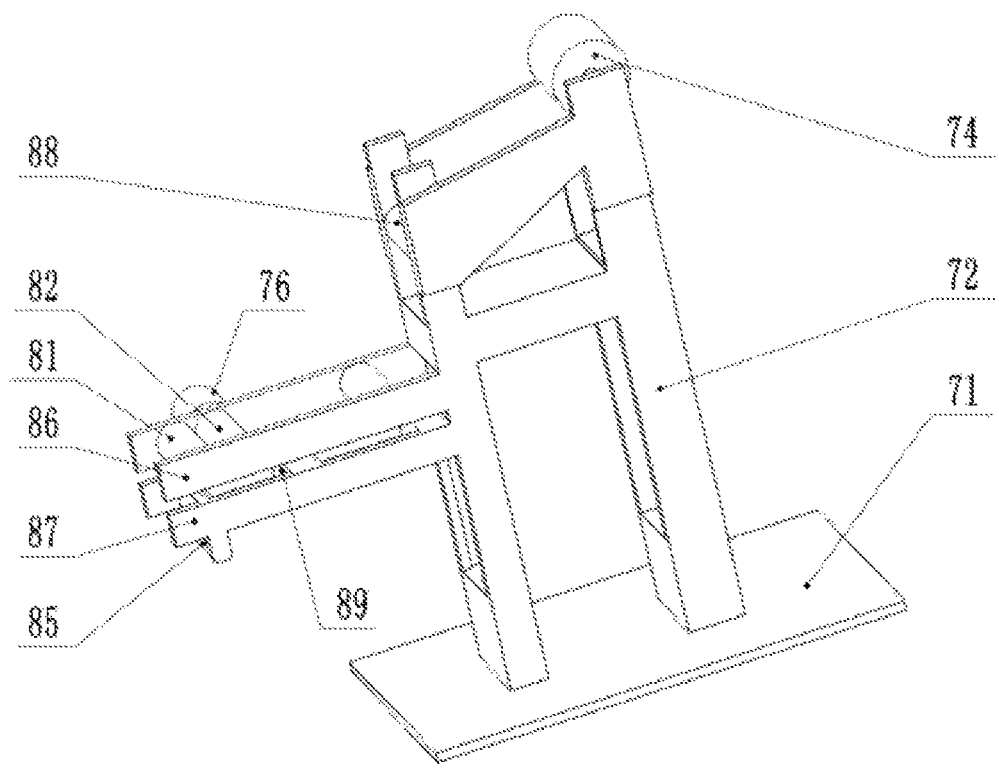
FIG. 5 is a three-dimensional structure diagram of an adhesive tape pasting stand (72) in FIG. 3.

Referring to FIG. 3, FIG. 4 and FIG. 6, the adhesive tape pasting cantilever assembly (73) is mounted in the adhesive tape pasting cantilever assembly mounting holes (83) of the adhesive tape pasting stand (72) through a pair of lifting rods (91), and the adhesive tape pasting head (78) of the cantilever type plane automatic adhesive tape pasting device and a cantilever end of the adhesive tape pasting stand (72) are located at the same side.

The pasting process of the adhesive tape in the embodiment refers to FIG. 1, FIG. 2, FIG. 7, FIG. 8, FIG. 9, and FIG. 10.

1) Adhesive Tape Mounting

Figure 7:
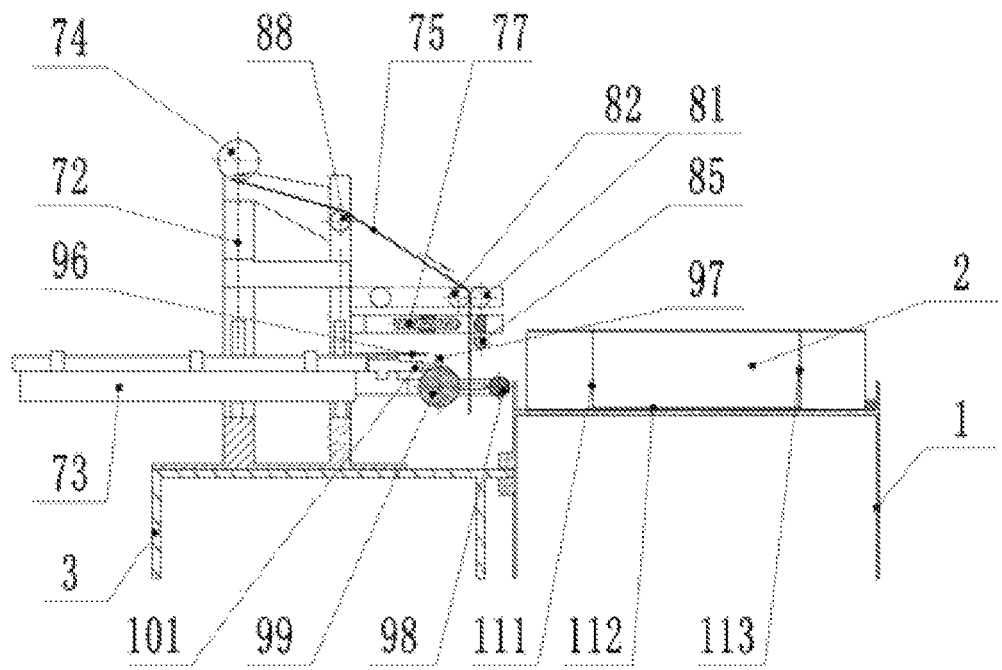
FIG. 7 is a cross-sectional view of A-A of FIG. 2-mounting diagram of an adhesive tape.

Referring to FIG. 1 and FIG. 7, an adhesive tape roll is mounted on the adhesive tape fixing roller (74) of the adhesive tape pasting stand (72) of the cantilever type plane automatic adhesive tape pasting device (4), the pull-open adhesive tape (75) passes through the upper side of the adhesive tape guide roller B (88), and then passes through a space between the adhesive tape feeding driven roller (81) and the adhesive tape feeding driving roller (82); when the adhesive tape feeding motor (76) moves, the downward feeding of the adhesive tape is achieved;

the adhesive tape passes through the space between the adhesive tape cutting knife (77) and a cutting board, and downwards falls into the space between the adhesive tape pressing fixed roller (98) and the adhesive tape pressing roller (99) which are kept at a certain distance.

2) Adhesive Tape Clamping

Figure 8:
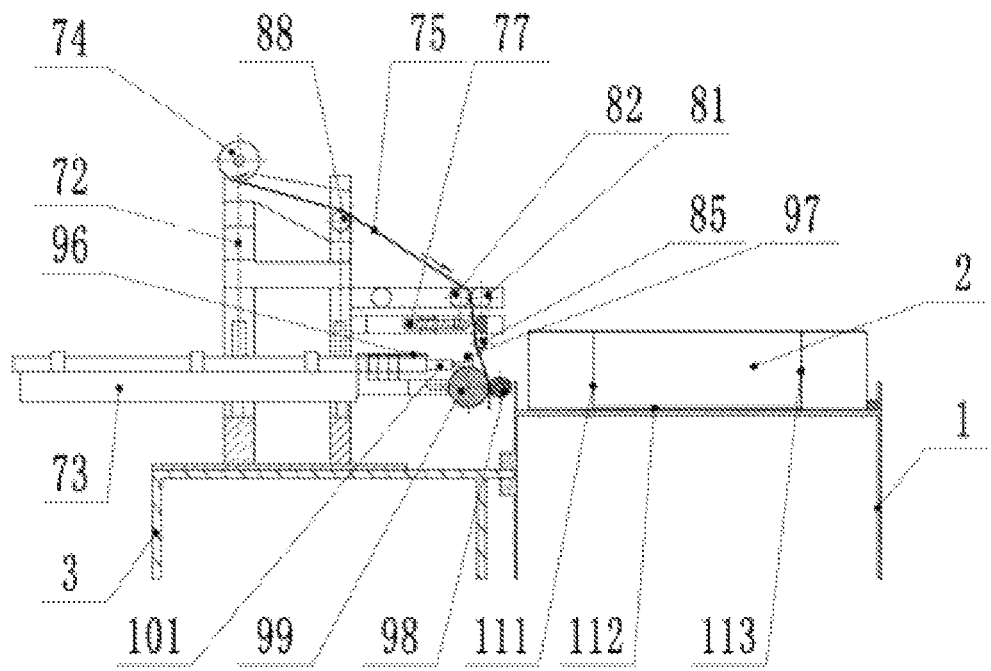
FIG. 8 is a clamping diagram of an adhesive tape of FIG. 7.

Referring to FIG. 8, after the adhesive tape passes through the space between the adhesive tape pressing fixed roller (98) and the adhesive tape pressing roller (99) with a certain length, the adhesive tape pressing roller push-pull device (101) pushes the adhesive tape pressing roller (99) and the adhesive tape pressing fixed roller (98) which are fixed to the adhesive tape pressing roller stand (97) to clamp, and the adhesive tape feeding motor (76) stops moving at the moment.

3) Adhesive Tape Feeding and Cutting

Figure 9:
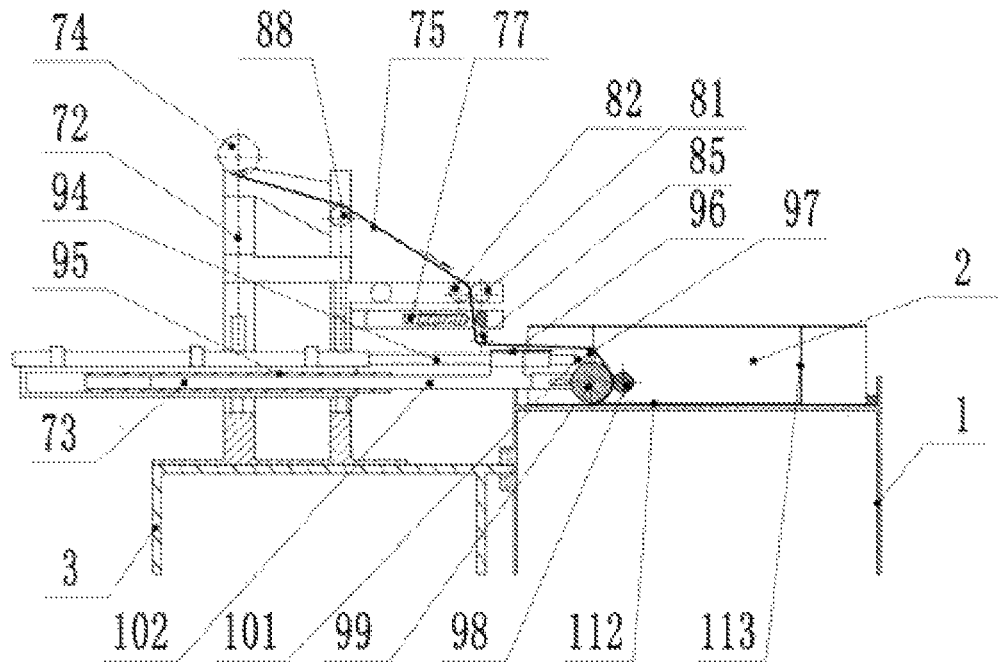
FIG. 9 is a feeding diagram of an adhesive tape of FIG. 7.
Figure 10:
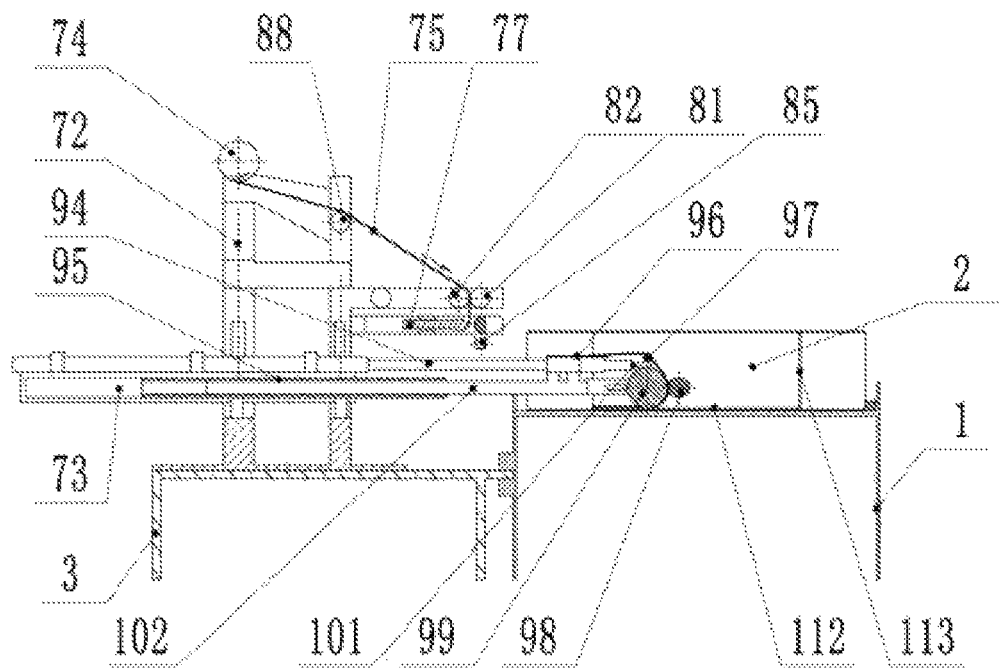
FIG. 10 is a cutting and pasting diagram of an adhesive tape of FIG. 7.

Referring to FIG. 9 and FIG. 10, when the item (2) needing adhesive tape pasting is positioned on the platform (1) for the item needing adhesive tape pasting, the adhesive tape pasting push-pull device (94) in the adhesive tape pasting cantilever assembly (73) of the cantilever type plane automatic adhesive tape pasting device (4) starts to work, the adhesive tape pasting push-pull rod (103) is pushed to push the adhesive tape pasting head (78) to move forwards to extend into an opened item (2) needing adhesive tape pasting, the adhesive tape moves forwards at the same time under the action of the adhesive tape pressing fixed roller (98) and the adhesive tape pressing roller (99) at the moment, and the pull-open adhesive tape is supported by the top ends of the adhesive tape guide roller A (85) and the adhesive tape pressing roller stand (97);

when the length of the stretched adhesive tape reaches the length of an adhesive tape pasting position (112) of the item (2) needing adhesive tape pasting, the adhesive tape cutting knife (77) acts to cut off the adhesive tape passing through the space between the adhesive tape cutting knife (77) and the cutting board, and a part of the cut adhesive tape falls on the upper surface of the adhesive tape placing baffle (96).

4) Adhesive Tape Pasting

Referring to FIG. 9, when the adhesive tape pressing roller (99) of the adhesive tape pressing head (78) reaches an adhesive tape pasting starting position (111) of the item (2) needing adhesive tape pasting, the whole adhesive tape pasting cantilever assembly (73) and the adhesive tape pasting head (78) descends through the lifting guide rods (91), and the adhesive tape pressing roller (99) and the adhesive tape are in contact with the adhesive tape pasting position (112) of the item (2) needing adhesive tape pasting;

referring to FIG. 10, after the adhesive tape pressing roller (99) of the adhesive tape pressing head (78) is in contact with the adhesive tape pasting position (112) of the item (2) needing adhesive tape pasting, the adhesive tape pasting head (78) moves forwards under the pushing of the adhesive tape pasting push-pull rod (103), the adhesive tape at the bottom of the adhesive tape pressing roller (99) starts to be pasted to the surface of the adhesive tape pasting position (112) in the forward and clockwise rotation processes of the adhesive tape pressing roller (99) until the adhesive tape pasting position (112) of the whole item (2) needing at the adhesive tape pasting ending position (113) is finished in adhesive tape pasting.

5) Return Stroke of Adhesive Tape Pasting Head (78)

Referring to FIG. 7, the adhesive tape pasting head (78) finishing the adhesive tape pasting process returns to an adhesive tape entering position under the action of the adhesive tape pasting push-pull rod (103) of the adhesive tape pasting push-pull device (94). In the return process, the first-stage pull-out cantilever (95) and the second-stage pull-out cantilever (102) return into the fixed cantilever sleeve (92); the adhesive tape pressing roller (99) in the adhesive tape pasting head (78) is separated from the adhesive tape pressing fixed roller (98) under the action of the adhesive tape pressing roller push-pull device (101), and the distance between the adhesive tape pressing roller (99) and the adhesive tape pressing fixed roller (98) is recovered to the distance before the adhesive tape enters; and the lifting guide rods (91) at the bottom of the adhesive tape pasting cantilever assembly (73) ascends.

By repeating the above process after replacing the item (2) needing adhesive tape pasting, the automatic adhesive tape pasting process in position and fixed length on the inner and outer surfaces of the item (2) needing adhesive tape pasting can be achieved.

What is claimed is:
1. A cantilever type plane automatic adhesive tape pasting device, comprising:
a base;

an adhesive tape pasting stand that is an H-shaped structure and is fixed onto the base, the adhesive tape pasting stand including:
  legs;
  an adhesive tape feeding driven roller having a roller surface that is pasted with a release film;
  symmetrical cantilever assembly guide grooves formed in inner sides of leg openings formed in the legs of the H-shaped structure; and
  adhesive tape pasting cantilever assembly mounting holes formed in bottom surfaces of the leg openings;
an adhesive tape pasting cantilever assembly that is a telescopic structure and is mounted at the leg openings;
an adhesive tape fixing roller fixed to an upper part of the H-shaped structure;
a pull-open adhesive tape is a piece of tape that is pulled off of an adhesive tape mounted on the adhesive tape fixing roller;
an adhesive tape pasting head;
an adhesive tape feeding driving roller;
an adhesive tape feeding cantilever that is a double-layer cantilever adhesive tape feeding cantilever and on the adhesive tape pasting stand, the adhesive tape feeding driven roller and driving roller are mounted at an end part of the adhesive tape feeding cantilever;
an adhesive tape cutting cantilever that is arranged with the adhesive tape cutting cantilever are at one side of the H-shaped structure;
an adhesive tape guide roller A having a roller surface that is pasted with a release film, the adhesive tape guide roller A is mounted below an end part of the adhesive tape cutting cantilever;
an adhesive tape guide roller B fixed to the upper part of the H-shaped structure, the adhesive tape guide roller B is lower than the adhesive tape fixing roller;
a cutting knife mounting hole formed in a middle of the adhesive tape cutting cantilever;
an adhesive tape feeding motor fixed to an outer side of the adhesive tape feeding cantilever and is coaxial with the adhesive tape feeding driving roller; and
an adhesive tape cutting knife fixed to the cutting knife mounting hole.

2. The cantilever type plane automatic adhesive tape pasting device according to claim 1, wherein the adhesive tape pasting cantilever assembly includes:
  a lifting guide rod;
  a fixed cantilever sleeve;
  cantilever guide blocks fixed to two side faces of one end of the fixed cantilever sleeve
  an adhesive tape pasting push-pull device fixed to a top of the fixed cantilever sleeve;
  a first-stage pull-out cantilever;
  a second-stage pull-out cantilever having an end part that is a fork structure having an adhesive tape pressing roller guide groove, wherein the first-stage and second-stage pull-out cantilevers are mounted in the fixed cantilever sleeve; and
  an adhesive tape pasting push-pull rod;
  wherein the fixed cantilever sleeve, the first-stage pull-out cantilever and the second-stage pull-out cantilever form a pull-out cantilever and are of a pull-out structure; and a pair of lifting guide rods is fixed below the fixed cantilever sleeve.

3. The cantilever type plane automatic adhesive tape pasting device according to claim 2, wherein the adhesive tape pasting head is mounted at one end of the second-stage pull-out cantilever, the adhesive tape pasting head including:
  an adhesive tape placing baffle;
  an adhesive tape pressing roller stand;
  an adhesive tape pressing fixed roller;
  an adhesive tape pressing roller;
  an adhesive tape pressing roller push-pull device that controls a distance between the adhesive tape pressing fixed roller and the adhesive tape pressing roller;
  a baffle support;
  a compressing support; and
  a push-pull rod of the adhesive tape pressing roller push-pull device fixed to the adhesive tape pressing roller stand;
  wherein the adhesive tape pressing fixed roller is fixed to the end part of the fork structure of the second-stage pull-out cantilever;
  wherein the adhesive tape pressing roller is mounted in the adhesive tape pressing roller guide groove at the end part of the second-stage pull-out cantilever through the adhesive tape pressing roller stand;
  wherein the baffle support and the compressing support are fixed to an upper side of the end part of the fork structure of the second-stage pull-out cantilever; and
  wherein the adhesive tape placing baffle is fixed to a top of the baffle support and the compressing support.

4. The cantilever type plane automatic adhesive tape pasting device according to claim 3, wherein the adhesive tape pasting push-pull rod in the adhesive tape pasting push-pull device on the adhesive tape pasting cantilever assembly is fixed to the baffle support in the adhesive tape pasting head.

5. The cantilever type plane automatic adhesive tape pasting device according to claim 2, wherein the adhesive tape pasting cantilever assembly is mounted in the adhesive tape pasting cantilever assembly mounting holes of the adhesive tape pasting stand through the pair of lifting guide rods, and the adhesive tape pasting head of the cantilever type plane automatic adhesive tape pasting device and a cantilever end of the adhesive tape pasting stand are located at a same side.

6. The cantilever type plane automatic adhesive tape pasting device according to claim 3, wherein a roller surface of the adhesive tape pressing fixed roller is pasted with a release film.

7. The cantilever type plane automatic adhesive tape pasting device according to claim 3, wherein a surface of the adhesive tape pressing roller is made of an elastic material.

8. The cantilever type plane automatic adhesive tape pasting device according to claim 1, wherein the pull-open adhesive tape is in a disconnected state before being pasted to an adhesive tape pasting position.

\* \* \* \* \*